US007134121B2

(12) United States Patent
Bates et al.

(10) Patent No.: US 7,134,121 B2
(45) Date of Patent: Nov. 7, 2006

(54) INSTALLING FIXES BASED ON USAGE

(75) Inventors: Cary Lee Bates, Rochester, MN (US); Paul Reuben Day, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 588 days.

(21) Appl. No.: 10/459,760

(22) Filed: Jun. 12, 2003

(65) Prior Publication Data

US 2004/0255290 A1   Dec. 16, 2004

(51) Int. Cl.
G06F 9/44 (2006.01)
G06F 9/445 (2006.01)
G06F 12/00 (2006.01)

(52) U.S. Cl. .................. 717/170; 717/168; 717/174; 707/200

(58) Field of Classification Search ............... None
See application file for complete search history.

(56) References Cited

U.S. PATENT DOCUMENTS 6,418,554 B1 * 7/2002 Delo et al. .................. 717/174
2003/0145317 A1 * 7/2003 Chamberlain ............... 717/177

OTHER PUBLICATIONS

Cahill Jr, Install Archive Feature, Apr. 1994, IBM® Technical Disclosure Bulletin, vol. 37, No. 04A.*

Atwater-Clark-Johnson, Method for Automatic Execution of a Program upon Determination of a System Constraint Predicate, Jun. 1993, IBM® Technical Disclosure Bulletin, vol. 36, No. 06A.*

Doyle-Johnson, Method for Inhibiting Execution of a Program upon Determination of a System Constraint Predicate, Jul. 1993, IBM® Technical Disclosure Bulletin, vol. 36, No. 07.*

Harring, Method for Counting Instructions Executed, IBM® Technical Disclosure Bulletin, TDB Jan. 1979, p. 3257.*

Advani-Hughes, Device/Profile Installation Procedure with Validation, IBM® Technical Disclosure Bulletin, TDB Sep. 1985, p. 1487.*

Gaudette-Hebalkar-Smith, Activity Indicator for Pages, TDB Sep. 1972, p. 1218-1220.*

* cited by examiner

Primary Examiner—Antony Nguyen-Ba
(74) Attorney, Agent, or Firm—Owen J. Gamon

(57) ABSTRACT

A method, apparatus, system, and signal-bearing medium that in an embodiment install a new or fixed version of a program if the program or a feature in the program has been used more than a threshold number of times. If the program has not been used more than the threshold, the new or fixed version of the program is not installed. In an embodiment, an environmental condition is used in determining whether to install the new or fixed version. In this way, the risk that the new version will cause new problems is balanced with the likelihood that the problem solved by the new version will be encountered.

16 Claims, 5 Drawing Sheets

INSTALLING FIXES BASED ON USAGE

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever.

FIELD

This invention generally relates to computers and more specifically relates to installing a fix to a computer program based on the usage of the program.

BACKGROUND

The development of the EDVAC computer system of 1948 is often cited as the beginning of the computer era. Since that time, computer systems have evolved into extremely sophisticated devices, and computer systems may be found in many different settings. Computer systems typically include a combination of hardware, such as semiconductors and circuit boards, and software, also known as computer programs. As advances in semiconductor processing and computer architecture push the performance of the computer hardware higher, more sophisticated and complex computer software has evolved to take advantage of the higher performance of the hardware, resulting in computer systems today that are much more powerful than just a few years ago.

As the sophistication and complexity of computer software increase, the more problems, faults, or errors the software tends to have. Thus, it is common after a release of a software program for a customer to report a problem and the developer of the software to fix the problem and release a new version of the software that fixes the problem. Developers often release multiple versions that include fixes for different problems, and these versions are separate from the regularly scheduled releases of the software. Sometimes the versions are called PTFs (Program Temporary Fixes) to distinguish them from the regularly scheduled releases, which include not only fixes to problems but also new and enhanced functions.

Usually, only customers that have encountered the problem and have a specific need for a solution will want to install the new version that includes the fix because a fix to one problem might inadvertently cause another problem. Customers that have not encountered the problem or who perceive a low likelihood of encountering the problem will wait until the fix has been used by others for a substantial length of time without problems in order to lessen the risk of installing the fix to the software. Other customers have no idea of the risk versus benefit of installing fixes, so they blindly install all fixes or install no fixes at all.

Some customers have the resources to employ a system administrator, who knows the needs and software usage patterns of the customer's users. This system administrator might be savvy enough to read the list of available fixes and problems and make an informed and intelligent choice regarding which fix to apply to which users' computer. The system administrator might take into account the length of time the fixed version has been available, the harm to the customer that might occur if the problem is encountered, and the likelihood that the problem will be encountered. But, with the advent of the Internet and the desire by many customers to reduce costs by avoiding the need to employ system administrators, applying fixes is becoming more automated with less intervention by a human decision-maker.

Without a better way to automatically decide which fixes to install, customers will continue to suffer the costs of employing human decision-makers, will continue to install fixes that introduce risk but no benefit, and will continue to encounter problems even though a fix was available that they could have installed to obviate the problem.

SUMMARY

A method, apparatus, system, and signal-bearing medium are provided that in an embodiment install a new or fixed version of a program if the program or a feature in the program has been used more than a threshold number of times. If the program has not been used more than the threshold, the new or fixed version of the program is not installed. In an embodiment, an environmental condition is used in determining whether to install the new or fixed version. In this way, the risk that the new version will cause new problems is balanced with the likelihood that the problem solved by the new version will be encountered.

DETAILED DESCRIPTION

Figure 1:
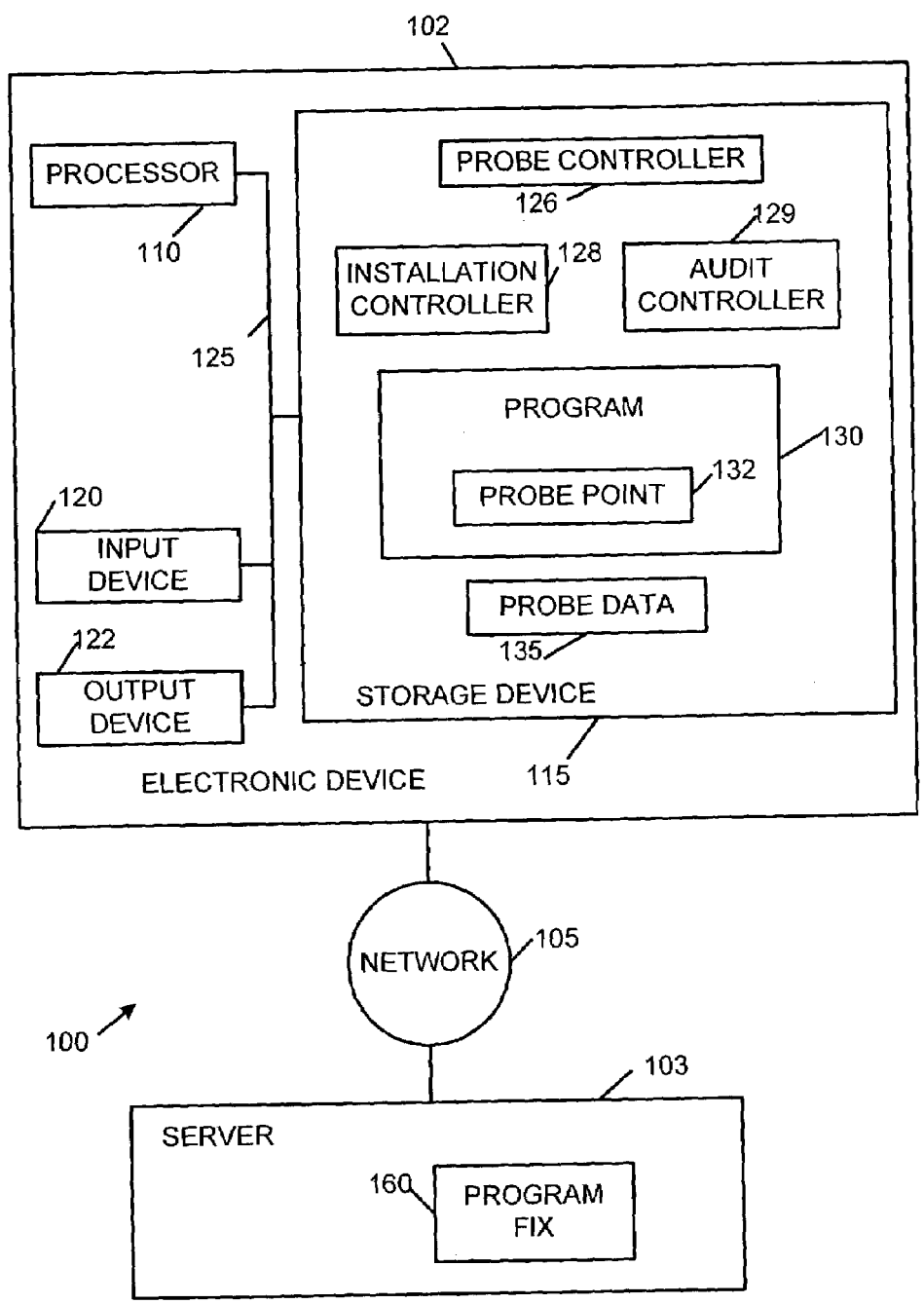
FIG. 1 depicts a block diagram of an example system for implementing an embodiment of the invention.

FIG. 1 depicts a block diagram of an example system 100 for implementing an embodiment of the invention. The system 100 includes an electronic device 102 connected to a server 103 via a network 105. Although only one electronic device 102, one server 103, and one network 105 are shown, in other embodiments any number or combination of them may be present. In another embodiment, the server 103 and the network 105 are not present.

The electronic device 102 includes a processor 110, a storage device 115, an input device 120, and an output device 122, all connected directly or indirectly via a bus 125. The processor 110 represents a central processing unit of any type of architecture, such as a CISC (Complex Instruction Set Computing), RISC (Reduced Instruction Set Computing), VLIW (Very Long Instruction Word), or a hybrid architecture, although any appropriate processor may be used. The processor 110 executes instructions and includes that portion of the electronic device 102 that controls the operation of the entire electronic device. Although not depicted in FIG. 1, the processor 110 typically includes a control unit that organizes data and program storage in memory and transfers data and other information between the various parts of the electronic device 102. The processor 110 reads and/or writes code and data to/from the storage device 115, the network 105, the input device 120, and/or the output device 122.

Although the electronic device 102 is shown to contain only a single processor 110 and a single bus 125, embodiments of the present invention apply equally to electronic devices that may have multiple processors and multiple buses with some or all performing different functions in different ways.

The storage device 115 represents one or more mechanisms for storing data. For example, the storage device 115 may include read only memory (ROM), random access memory (RAM), magnetic disk storage media, hard disk media, floppy disk media, tape media, CD (compact disk) media, DVD (digital video disk) media, optical storage media, flash memory devices, and/or other machine-readable media. In other embodiments, any appropriate type of storage device may be used. Although only one storage device 115 is shown, multiple storage devices and multiple types of storage devices may be present. Further, although the electronic device 102 is drawn to contain the storage device 115, the storage device 115 may be external to the electronic device 102 and/or may be distributed across other electronic devices, such as devices connected to the network 105.

The storage device 115 includes a probe controller 126, an installation controller 128, an audit controller 129, a program 130, and probe data 135, all of which may in various embodiments have any number of instances. The probe controller 126 accesses the probe data 135 in order to track the usage of the program 130. In an embodiment, the probe controller 126 includes instructions capable of executing on the processor 110 or statements capable of being interpreted by instructions executing on the processor 110 to carry out the functions as further described below with reference to FIG. 3 using the probe data 135. In another embodiment, the probe controller 126 may be implemented in hardware via logic gates and/or other appropriate hardware techniques.

The installation controller 128 determines whether to install a new version or a fix to the program 130 based on the probe data 135. The installation controller 128 may obtain a new version or fix from the server 103. In another embodiment, the installation controller 128 may obtain the new version or fix from storage media, such as a tape, CD (Compact Disc), diskette, or any other storage media. In an embodiment, the installation controller 128 includes instructions capable of executing on the processor 110 or statements capable of being interpreted by instructions executing on the processor 110 to carry out the functions as further described below with reference to FIG. 4 using the probe data 135. In another embodiment, the installation controller 128 may be implemented in hardware via logic gates and/or other appropriate hardware techniques.

In an embodiment, the audit controller 129 includes instructions capable of executing on the processor 110 or statements capable of being interpreted by instructions executing on the processor 110 to carry out the functions as further described below with reference to FIG. 5 using the probe data 135. In another embodiment, the audit controller 129 may be implemented in hardware via logic gates and/or other appropriate hardware techniques.

The program 130 may be any software for which a new version or fix might be available in the future. The program 130 includes at least one probe point 132. In an embodiment, the program 130 may have multiple probe points corresponding to multiple functions, modules, routines, methods, or any other appropriate unit with the program 130. In another embodiment, the program 130 may be a function, module, routine, method, or any other appropriate unit within or associated with another program (not shown). The owner, developer, manufacturer, or distributor of the program 130 may determine the location of the probe point 132.

The probe point 132 invokes the probe controller 126 when the program 130 encounters the probe point 132 while executing on the processor 110. In an embodiment, the probe point 132 may be an op code replacement in the program 130.

The probe controller 126 may disable the probe point 132 if the probe point 132 is encountered enough times that it is clear that a fix should be applied; in such a case, there is no need to continue tracking that probe point. The audit controller 129 periodically audits the collected probe data 135 and may re-enable certain probe points to verify that the program 130 is still being used in the same way. Although the program 130 is drawn as being separate from the probe controller 126, in another embodiment, the probe controller 126 is embedded in the program 130. For example, the program 130 may be a macro, a compiler directive such as #pragma, or any other syntactical specification mechanism.

The probe data 135 includes usage data regarding the program 130 and the probe point 132. The probe data 135 is further described below with reference to FIG. 2.

Although the probe controller 126, the installation controller 128, the audit controller 129, the program 130, and the probe data 135 are illustrated as being separate entities, in other embodiments some or all of them may be packaged together. Although the probe controller 126, the installation controller 128, the audit controller 129, the program 130, and the probe data 135 are all illustrated as being contained within the storage device 115 in the electronic device 102, in other embodiments some or all of them may be on different electronic devices and may be accessed remotely, e.g., via the network 105.

The input device 120 may be a keyboard, mouse or other pointing device, trackball, touchpad, touchscreen, keypad, microphone, voice recognition device, or any other appropriate mechanism for the user to input data to the electronic device 102 and/or to manipulate the user interfaces of the electronic device 102. Although only one input device 120 is shown, in another embodiment any number and type of input devices may be present.

The output device 122 is that part of the electronic device 102 that presents output to the user. The output device 122 may be a cathode-ray tube (CRT) based video display well known in the art of computer hardware. But, in other embodiments the output device 122 may be replaced with a liquid crystal display (LCD) based or gas, plasma-based, flat-panel display. In still other embodiments, any appropriate display device may be used. In other embodiments, a speaker or a printer may be used. In other embodiments any appropriate output device may be used. Although only one output device 122 is shown, in other embodiments, any number of output devices of different types or of the same type may be present.

The bus 125 may represent one or more busses, e.g., PCI (Peripheral Component Interconnect), ISA (Industry Standard Architecture), X-Bus, EISA (Extended Industry Standard Architecture), or any other appropriate bus and/or bridge (also called a bus controller).

The electronic device 102 may be implemented using any suitable hardware and/or software, such as a personal computer. Portable computers, laptop or notebook computers, PDAs (Personal Digital Assistants), pocket computers, telephones, pagers, automobiles, teleconferencing systems, appliances, and mainframe computers are examples of other possible configurations of the electronic device 102. The hardware and software depicted in FIG. 1 may vary for specific applications and may include more or fewer elements than those depicted. For example, other peripheral devices such as audio adapters, or chip programming devices, such as EPROM (Erasable Programmable Read-Only Memory) programming devices may be used in addition to or in place of the hardware already depicted.

The network 105 may be any suitable network or combination of networks and may support any appropriate protocol suitable for communication of data and/or code to/from the electronic device 102. In various embodiments, the network 105 may represent a storage device or a combination of storage devices, either connected directly or indirectly to the electronic device 102. In an embodiment, the network 105 may support the Infiniband architecture. In another embodiment, the network 105 may support wireless communications. In another embodiment, the network 105 may support hard-wired communications, such as a telephone line or cable. In another embodiment, the network 105 may support the Ethernet IEEE (Institute of Electrical and Electronics Engineer) 802.3× specification. In another embodiment, the network 105 may be the Internet and may support IP (Internet Protocol). In another embodiment, the network 105 may be a local area network (LAN) or a wide area network (WAN). In another embodiment, the network 105 may be a hotspot service provider network. In another embodiment, the network 105 may be an intranet. In another embodiment, the network 105 maybe a GPRS (General Packet Radio Service) network. In another embodiment, the network 105 may be any appropriate cellular data network or cell-based radio network technology. In another embodiment, the network 105 may be an IEEE 802.11B wireless network. In still another embodiment, the network 105 may be any suitable network or combination of networks. Although one network 105 is shown, in other embodiments any number of networks (of the same or different types) may be present.

The server 103 includes a program fix 160. In an embodiment, the program fix 160 is a new version of the program 130. In another embodiment, the program fix 160 is a new version of only a portion of the program 130. In another embodiment, the installation controller 128 accesses the program fix 160 via the network 105 and the server 103. In various embodiments, a new version of the program may include only a fix or fixes, both fixes and new features, or only new features. Although FIG. 1 shows the program fix 160 to be included in the server 103, in another embodiment, the program fix 160 is encoded on a storage device and accessed by the installation controller 128 via the network 105 or accessed by the installation controller 128 via an attached device.

The various software components illustrated in FIG. 1 and implementing various embodiments of the invention may be implemented in a number of manners, including using various computer software applications, routines, components, programs, objects, modules, data structures, etc., referred to hereinafter as "computer programs," or simply "programs." The computer programs typically comprise one or more instructions that are resident at various times in various memory and storage devices in the electronic device 102, and that, when read and executed by one or more processors in the electronic device 102, cause the electronic device to perform the steps necessary to execute steps or elements embodying the various aspects of an embodiment of the invention.

Moreover, while embodiments of the invention have and hereinafter will be described in the context of fully functioning electronic devices, the various embodiments of the invention are capable of being distributed as a program product in a variety of forms, and the invention applies equally regardless of the particular type of signal-bearing medium used to actually carry out the distribution. The programs defining the functions of this embodiment may be delivered to the electronic device 102 via a variety of signal-bearing media, which include, but are not limited to:

(1) information permanently stored on a non-rewriteable storage medium, e.g., a read-only memory device attached to or within an electronic device, such as a CD-ROM readable by a CD-ROM drive;

(2) alterable information stored on a rewriteable storage medium, e.g., a hard disk drive or diskette; or (3) information conveyed to an electronic device by a communications medium, such as through a computer or a telephone network, e.g., the network 105, including wireless communications.

Such signal-bearing media, when carrying machine-readable instructions that direct the functions of the present invention, represent embodiments of the present invention.

In addition, various programs described hereinafter may be identified based upon the application for which they are implemented in a specific embodiment of the invention. But, any particular program nomenclature that follows is used merely for convenience, and thus embodiments of the invention should not be limited to use solely in any specific application identified and/or implied by such nomenclature.

The exemplary environments illustrated in FIG. 1 are not intended to limit the present invention. Indeed, other alternative hardware and/or software environments may be used without departing from the scope of the invention.

Figure 2:
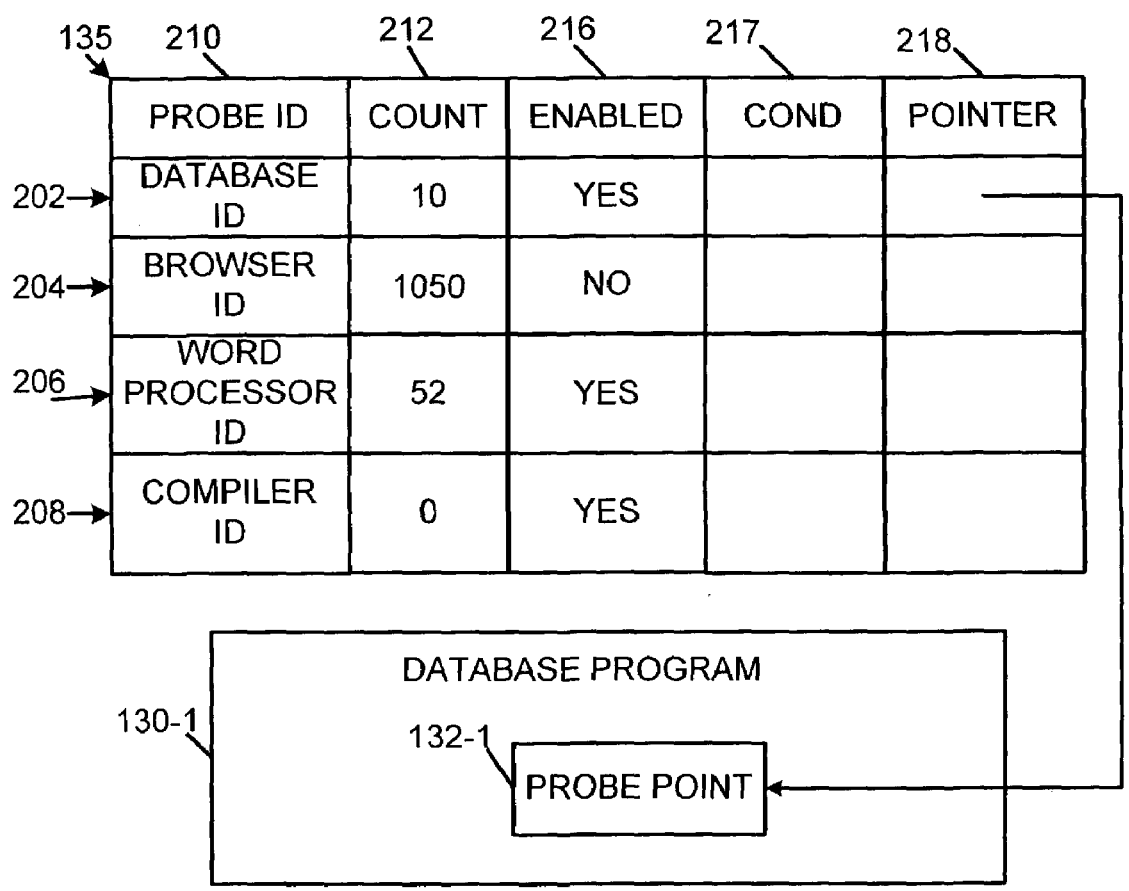
FIG. 2 depicts a block diagram of an example data structure, according to an embodiment of the invention.

FIG. 2 depicts a block diagram of an example data structure for the probe data 135, according to an embodiment of the invention. The probe data 135 includes entries 202, 204, 206, and 208, but in other embodiments any number of entries may be present. In an embodiment, entries in the probe data 135 are created and initialized by a compiler of the programs 130 or other appropriate tool. In another embodiment, the probe controller 126 creates and initializes the entries in the probe 135 upon initially encountering the probe points 132. Each entry includes a probe identifier field 210, a count field 212, an enabled indicator field 216, an environmental condition 217, and a pointer field 218, but in other embodiments more or fewer fields may be present.

The probe identifier 210 identifies the program 130 (or a portion of the program 130, such as a module, method, routine, function, or other unit) associated with the entry. For example, the entry 202 is associated with a database program, the entry 204 is associated with a browser program, the entry 206 is associated with a word processor program, and the entry 208 is associated with a compiler program. But, in other embodiments any appropriate programs or units in programs may be used. In an embodiment, every probe point 132 has a unique probe identifier 210. In another embodiment, the probe identifier 210 uniquely identifies the program 130, which may have multiple probe points 132, which are uniquely identified by the pointer 218.

In an embodiment, the usage count 212 indicates the number of times that the program 130 identified by the probe identifier 210 has encountered the probe point 132 identified by the pointer 218. In another embodiment, the count 212 indicates only a partial number of times that the program 130 has encountered the probe point 132, as further described below with reference to FIGS. 3 and 5.

The enabled indicator 216 indicates whether the probe point 132 identified by the probe identifier 210 and/or the pointer 218 is enabled or disabled. If the probe point 132 is enabled, the probe point 132 invokes the probe controller 126 when execution of the program 130 encounters the probe point 132. If the probe point 132 is disabled, the probe point 132 does not invoke the probe controller 126 when execution of the program 130 encounters the probe point 132.

In an embodiment, the environmental condition 217 may contribute to a determination of whether the risk of the program 130 encountering the problem that the program fix 160 solves is greater than the risk of applying the program fix 160. In various embodiments, the environmental condition 217 may include the size of the program 130, the size of modules, methods, routines, or functions within the program 130, the number of records within a database that are associated with the program 130, the size of tables within a database associated with the program 130. In another embodiment, the environmental condition 217 may include the presence of particular files or file types, such as .wav, avi, jpg (e.g., sound files, movie files, or image files), and/or the size of particular files (e.g., a movie file of a certain size needs the program fix 160). In another embodiment, the environmental condition 217 may include whether a program references a particular file or references data of a specified type or value within a file. For example, the environmental condition 217 may specify that the program fix 160 is needed if an accounting application encounters a dollar amount over a specified value. In other embodiments, the environmental condition 217 may be any data that indicates that the program 130 is likely to encounter the specific problem that the program fix 160 solves.

The pointer 218 identifies the probe point 132 within the associated program 130 identified by the probe identifier 210. In the example illustrated in FIG. 2, the pointer 218 in the entry 202 points to the probe point 132-1 in the database program 130-1. The database program 130-1 is an example of the program 130, and the probe point 132-1 is an example of the probe point 132. The pointer 218 in the entries 204, 206, and 208 may include pointers to analogous probe points in analogous programs (not shown), corresponding to the contents of their respective probe identifiers 210.

Figure 3:
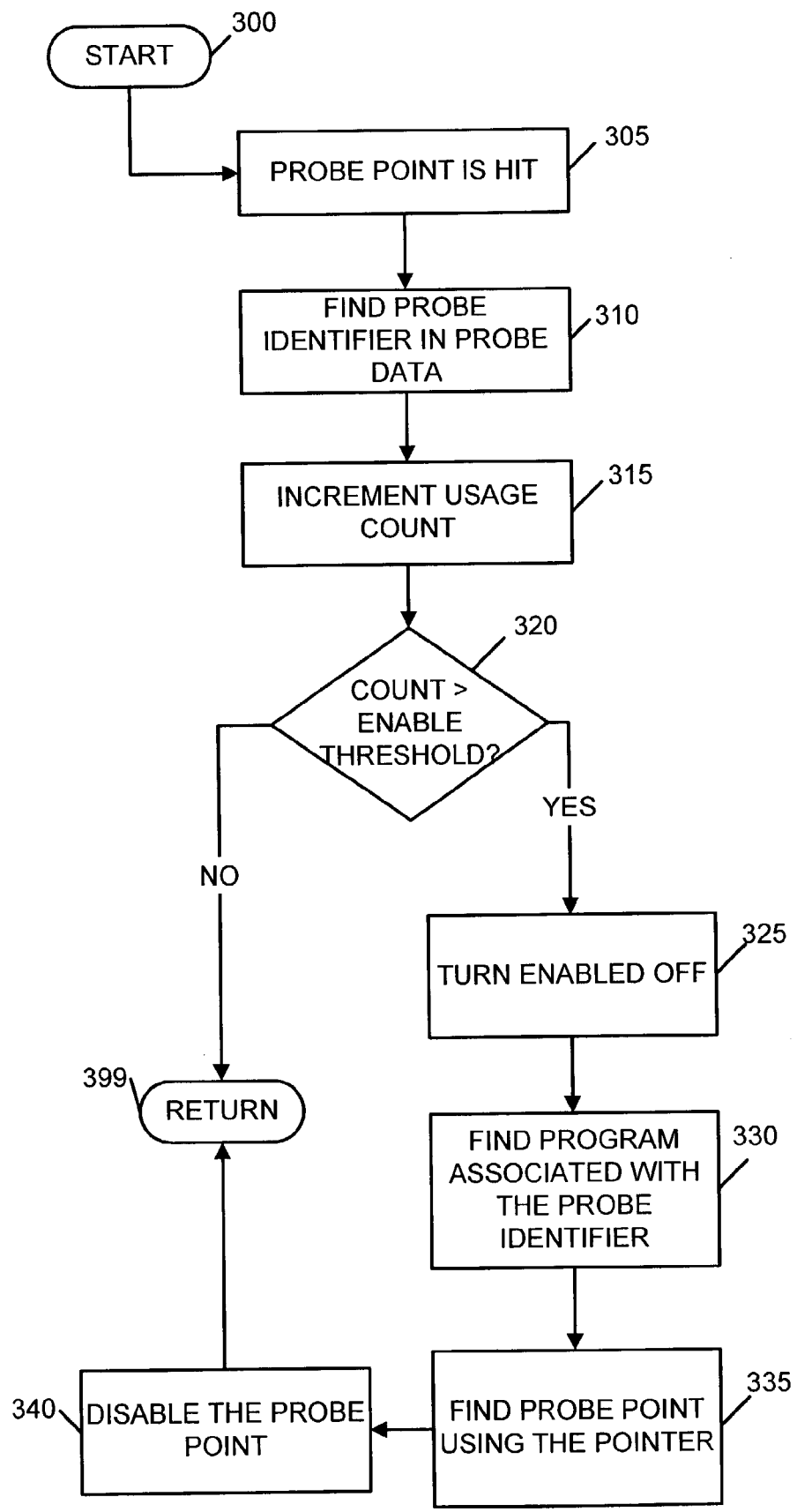
FIG. 3 depicts a flowchart of example processing for collecting data about program usage, according to an embodiment of the invention.

FIG. 3 depicts a flowchart of example processing for collecting data about the usage of the program 130, according to an embodiment of the invention. Control begins at block 300. Control then continues to block 305 where the program 130 encounters the probe point 132. The probe point 132 invokes the probe controller 126, passing an identifier of the program 130 and an identifier of the probe point 132 since in an embodiment a program may have multiple probe points. Control then continues to block 310 where the probe controller 126 finds an entry (e.g., entry 202, 204, 206, or 208) in the probe data 135 with a probe identifier 210 that matches the passed identifier of the program where the probe point was encountered. In an embodiment, the probe controller 126 creates and initializes the entry if it does not exist. In another embodiment, entries in the probe data 135 are pre-created by a compiler of the program 130 or other appropriate tool, as previously described above with reference to FIG. 2.

Control then continues to block 315 where the probe controller 126 increments the usage count 212 in the found entry. Control then continues to block 320 where the probe controller 126 determines whether the usage count 212 is greater than an enable threshold. In various embodiments, the enable threshold may be fixed, variable, the same for all programs 130, or different for some or all of the programs.

If the determination at block 320 is true, then control continues to block 325 where the probe controller 126 turns the enabled indicator 216 off in the found entry. Control then continues to block 330 where the probe controller 126 finds the program 130 associated with the probe identifier 210 in the found entry. Control then continues to block 335 where the probe controller 126 finds the probe point 132 using the pointer 218 in the found entry. Control then continues to block 340 where the probe controller 126 disables the probe point 132, so that the probe controller 126 will not be invoked the next time that the probe point 132 is encountered, which means the usage count 212 will not be incremented at block 315. Control then continues to block 399 where the function returns.

If the determination at block 320 is false, then control continues from block 320 to block 399 where the function returns.

Figure 4:
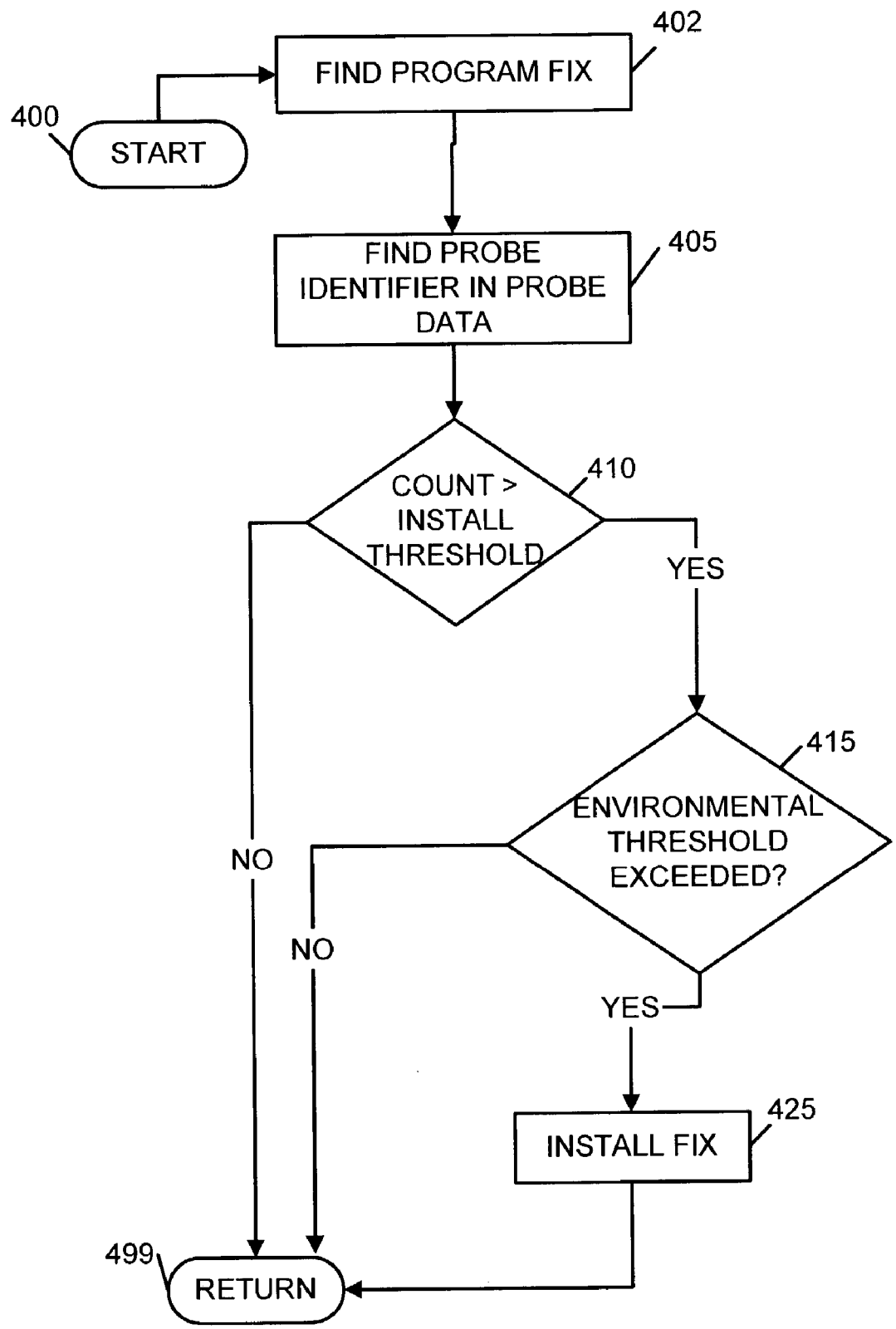
FIG. 4 depicts a flowchart of example processing for installing a new version of a program, according to an embodiment of the invention.

FIG. 4 depicts a flowchart of example processing for installing a new version of the program 130, according to an embodiment of the invention. Control begins at block 400. Control then continues to block 402 where the installation controller 128 determines that the program fix 160 is available and receives the program fix 160 and an identifier of the program 130 to which the program fix 160 is directed. In an embodiment, the installation controller 128 may determine whether the program fix 160 is available by periodically sending a query to the server 103. In another embodiment, the server 103 may notify the electronic device 102 when the program fix 160 is available. In another embodiment, an installation controller 128 determines that the program fix 160 is available by receiving a request from a user to install the program fix 160, either by downloading the program fix 160 from the server 103 or by reading the program fix 160 from a storage device, such as the storage device 115.

Control then continues to block 405 where the installation controller 128 finds an entry in the probe data 135 having a probe identifier 210 that matches the program identifier associated with the program fix 160. Control then continues to block 410 where the installation controller 128 determines whether the usage count 212 in the found entry is greater than an installation threshold. In various embodiments, the installation threshold may be fixed, variable, the same for all programs 130, different for at least some of the programs 130, the same for all program fixes 160, or different for at least some of the program fixes 160.

If the determination at block 410 is true, then control continues to block 415 where the installation controller 128 determines whether the environmental condition 217 meets or exceeds an environmental threshold. In another embodiment, the processing of block 415 is optional or not used.

If the determination at block 415 is true, then control continues to block 425 where the installation controller 128 installs the program fix 160 to the program 130 and resets the usage count 212 to zero. Control then continues to block 499 where the function returns.

If the determination at block 415 is false, then control continues to block 499 where the function returns.

If the determination at block 410 is false, then control continues to block 499 where the function returns.

Figure 5:
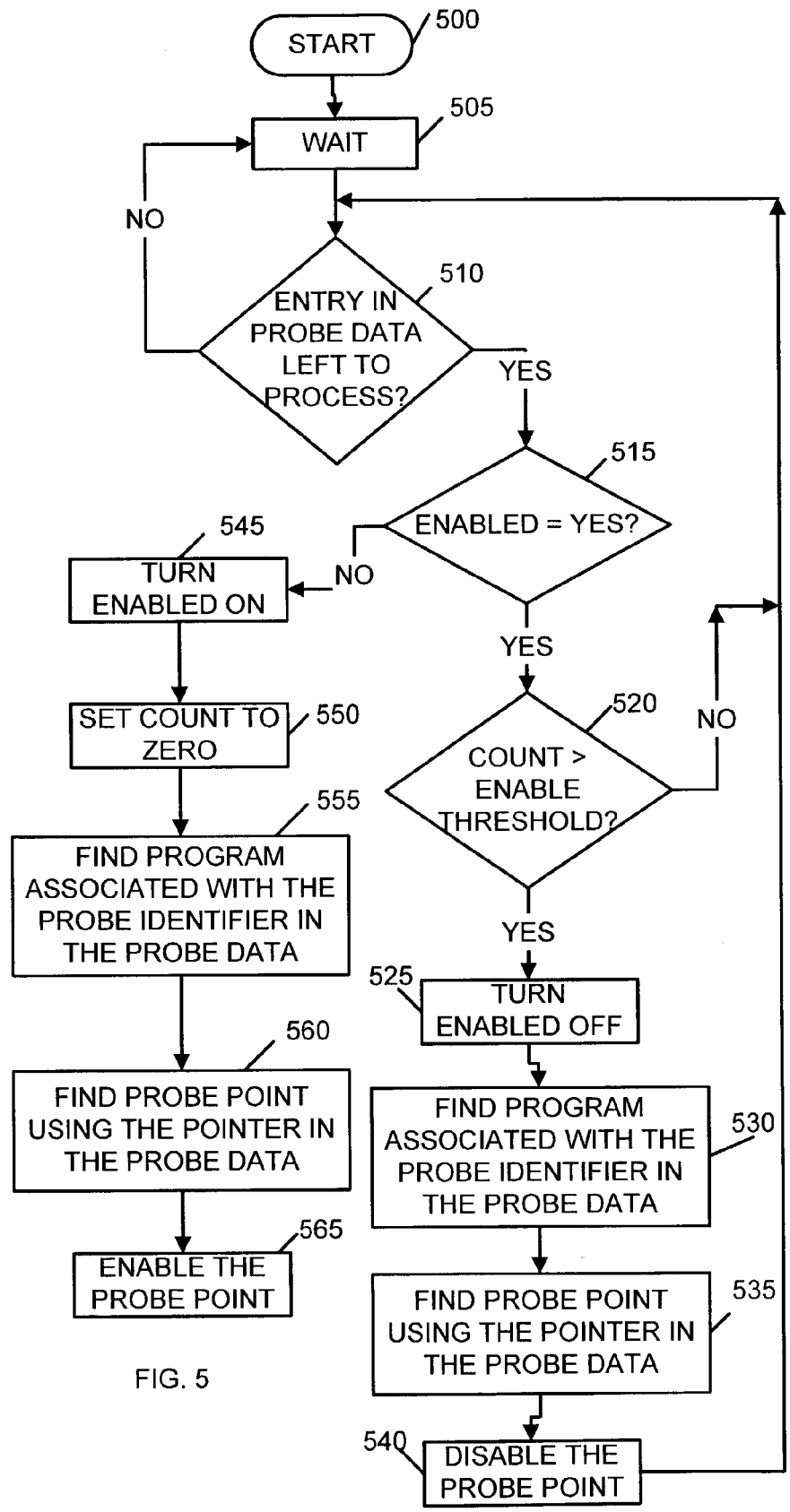
FIG. 5 depicts a flowchart of example processing for auditing program usage data, according to an embodiment of the invention.

FIG. 5 depicts a flowchart of example processing for the audit controller 129, according to an embodiment of the invention. Control begins at block 500. Control then continues to block 505 where the audit controller 129 waits for a period of time. In various embodiments, the period of time may be configured to seconds, minutes, hours, days, weeks, months, or any other appropriate criteria that will upon expiration start the enabling/disabling of probe points. Although an expiration of time is illustrated, in other embodiments other criteria may be used to enable/disable probe points, such as an operator or user request, the installation or upgrade of new hardware or software, or any other appropriate event.

Upon expiration of the period of time or upon the occurrence of the aforementioned event, control continues to block 510 where the audit controller 129 determines whether there is an entry in the probe data 135 left to process. If the determination at block 510 is true, then control continues to block 515 where the audit controller 129 sets the current entry to be the next entry in the probe data 135 and determines whether the enabled indicator 216 in the current entry in the probe data 135 indicates that the associated probe point 132 is enabled. If the determination at block 515 is true, then control continues to block 520 where the audit controller 129 determines whether the usage count 212 in the current entry in the probe data 135 is greater than an enable threshold.

If the determination at block 520 is true, then control continues to block 525 where the audit controller 129 turns the enabled indicator 216 off in the current entry in the probe data 135. Control then continues to block 530 where the audit controller 129 finds the program 130 associated with the probe identifier 210 in the current entry in the probe data 135. Control then continues to block 535 where the audit controller 129 finds the probe point 132 using the pointer 218 in the current entry in the probe data 135. Control then continues to block 540 where the audit controller 129 disables the found probe point 132 and moves to the next entry in the probe data 135. Control then returns to block 510, as previously described above.

If the determination at block 520 is false, then control returns to block 510, as previously described above.

If the determination at block 515 is false, then control continues to block 545 where the audit controller 129 turns the enabled indicator 216 on in the current entry. Control then continues to block 550 where the audit controller 129 sets the usage count 212 to zero in the current entry. Control then continues to block 555 where the audit controller 129 finds the program 130 associated with the probe identifier 210 in the current entry.

Control then continues to block 560 where the audit controller 129 finds the probe point 132 using the pointer 218 in the current entry. Control then continues to block 565 where the audit controller 129 enables the found probe point 132. In this way, the probe point 132 and the incrementing of its associated usage count 212 are re-enabled if the probe point has been disabled for a period of time. Control then returns to block 510, as previously described above.

If the determination at block 510 is false, then control returns to block 505 as previously described above.

Although embodiments of the invention as previously described above incorporate an automatic criteria for determining whether to install a new or fixed version, traditional mechanisms may still be used. For example, an administrator may choose to manually override the automatic mechanisms. Further, critical fixes may override the automatic criteria and may require that such fixes be installed immediately because of their importance.

In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. Different instances of the word "embodiment" as used within this specification do not necessarily refer to the same embodiment, but they may. The previous detailed description is, therefore, not to be taken in a limiting sense, and the scope of the present invention is defined only by the appended claims.

In the previous description, numerous specific details were set forth to provide a thorough understanding of the invention. But, the invention may be practiced without these specific details. In other instances, well-known circuits, structures, and techniques have not been shown in detail in order not to obscure the invention.

What is claimed is:

1. A method, comprising:
    counting a number of times a probe point in a program has been encountered via a usage count;
    comparing the usage count to a first threshold;
    installing a new version of a program if the usage count exceeds the first threshold;
    refraining from installing the new version if the usage count does not exceed the first threshold; and
    disabling the counting if the usage count exceeds a second threshold.

2. The method of claim 1, further comprising:
    re-enabling the counting if the counting has been disabled for a period of time.

3. The method of claim 1, further comprising:
    disabling the probe point if the usage count exceeds the second threshold.

4. The method of claim 1, further comprising:
    enabling the probe point and initializing the usage count to zero if the probe point has been disabled for a period of time.

5. A storage medium encoded with means for installing a new version of a program, wherein the means for installing further comprises:
    means for incrementing a usage count if the program encounters a probe point;
    means for comparing the usage count to a first threshold;
    means for installing a new version of the program if the usage count exceeds the first threshold; and
    means for disabling the means for incrementing if the usage count exceeds a second threshold.

6. The storage medium of claim 5, further comprising:
    means for refraining from installing the new version if the usage count does not exceed the first threshold.

7. The storage medium of claim 5, further comprising:
    means for resuming the means for incrementing if the means for incrementing has been disabled for a period of time.

8. A storage medium encoded with instructions, wherein the instructions when executed comprise:
    incrementing a usage count if a program encounters a probe point;
    determining that a new version of the program is available;
    comparing the usage count to a first threshold;
    installing the new version of the program if the usage count exceeds the threshold; and
    disabling the incrementing if the usage count exceeds a second threshold.

9. The storage medium of claim 8, further comprising:
resuming the incrementing in response to an event, wherein the event is selected from a group consisting of a user request, a software installation, and a hardware installation.

10. The storage medium of claim 8, wherein further comprises:
refraining from installing the new version if the usage count does not exceed the first threshold.

11. A storage medium encoded with a data structure accessed by a controller, wherein the data structure comprises a plurality of entries, wherein at least one of the plurality of entries comprises:
a probe identifier to identify a probe point within a program;
an environmental condition; and
a usage count, wherein the controller is to:
increment the usage count if the program encounters the probe point,
determine that a new version of the program is available,
install the new version if the usage count exceeds a first threshold and the environmental condition is met, and
disable the probe point if the usage count exceeds a second threshold.

12. The storage medium of claim 11, wherein the controller is further to:
enable the probe point and initialize the usage count to zero if the probe point has been disabled for a period of time.

13. The storage medium of claim 11, wherein the environmental condition is selected from a group consisting of: a size of the program, a number of records in a database associated with the program, a size of tables within the database, a presence of a first file, a presence of a second file having a specified file type, a reference of a third file, a reference of a fourth file that includes data of a specified value, and a presence of a fifth file having a specified size.

14. An electronic device comprising:
a processor; and
a storage device encoded with instructions, wherein the instructions when executed on the processor comprise:
incrementing a usage count if a program encounters a probe point while executing,
determining that a fix for the program is available,
comparing the usage count to a first threshold,
installing the fix if the usage count exceeds the first threshold,
refraining from installing the fix if the usage count is less than the first threshold, and
setting the usage count to zero if the usage count exceeds the first threshold.

15. The electronic device of claim 14, wherein the instructions further comprise:
disabling the probe point if the usage count exceeds a second threshold.

16. The electronic device of claim 14, wherein the instructions further comprise:
enabling the probe point and initializing the usage count to zero if the probe point has been disabled for a period of time.

\* \* \* \* \*